(12) United States Patent
Ward et al.

(10) Patent No.: US 8,535,516 B2
(45) Date of Patent: Sep. 17, 2013

(54) EFFICIENT METHOD FOR IMPROVED COKER GAS OIL QUALITY

(75) Inventors: John D. Ward, Katy, TX (US); Lisa M. Strassle, Ponca City, OK (US); Kevin Sitton, Katy, TX (US)

(73) Assignee: Bechtel Hydrocarbon Technology Solutions, Inc., Houston, TX (US)

( * ) Notice: Subject to any disclaimer, the term of this patent is extended or adjusted under 35 U.S.C. 154(b) by 629 days.

(21) Appl. No.: 12/763,712

(22) Filed: Apr. 20, 2010

(65) Prior Publication Data

US 2010/0270208 A1 Oct. 28, 2010

Related U.S. Application Data

(60) Provisional application No. 61/172,037, filed on Apr. 23, 2009.

(51) Int. Cl.
*C10G 9/14* (2006.01)
(52) U.S. Cl.
USPC ............... 208/131; 201/29; 201/30; 202/198; 202/261

(58) Field of Classification Search
USPC .................................................. 208/97, 131
See application file for complete search history.

(56) References Cited

U.S. PATENT DOCUMENTS

| | | |
|---|---|---|
| 4,213,846 A | 7/1980 | Sooter et al. |
| 4,455,219 A | 6/1984 | Janssen |
| 4,518,487 A | 5/1985 | Graf et al. |
| 4,549,934 A | 10/1985 | Graf et al. |
| 4,661,241 A | 4/1987 | Dabkowski et al. |
| 5,824,194 A | 10/1998 | Kruse |
| 6,270,656 B1 | 8/2001 | Gibson |
| 6,758,945 B1 | 7/2004 | Haik |

OTHER PUBLICATIONS

European Patent Office; Communication pursuant to Rules 161(1) and 163 EPC; 10719544.8; Sep. 12, 2011; 2 pages; Netherlands.
Vincent Jennings at Harrison Goddard Foote; Response to Communication pursuant to Rules 161 (1) and 163 EPC; 10719544; Jun. 15, 2012; 26 pages; United Kingdom.
Bernet, Oliver; EP Examination Report; Sep. 15, 2010; Application No. PCT/US2010/031924; 13 pages.

*Primary Examiner* — Randy Boyer
*Assistant Examiner* — Juan Valencia
(74) *Attorney, Agent, or Firm* — Crain Caton & James

(57) ABSTRACT

An efficient delayed coking process improvement for producing heavy coker gas oil of sufficient quality to be used as hydrocracker feedstock.

14 Claims, 3 Drawing Sheets

EFFICIENT METHOD FOR IMPROVED COKER GAS OIL QUALITY

CROSS-REFERENCE TO RELATED APPLICATIONS

This application claims priority benefit under 35 U.S.C. Section 119(e) to U.S. Provisional Patent Ser. No. 61/172,037 filed on Apr. 23, 2009 the entire disclosure of which is incorporated herein by reference.

FIELD OF THE INVENTION

This invention relates to delayed coking of hydrocarbons. More specifically, the invention provides a process for producing heavy coker gas oil of sufficient quality to be used as hydrocracker feedstock.

BACKGROUND OF THE INVENTION

The delayed coking process is an established petroleum refinery process which is used on heavy low value residuum feedstock to obtain lower boiling cracked products. Delayed coking can be considered a high severity thermal cracking process. The delayed coking process may be used on residuum feedstocks containing nonvolatile asphaltic materials which are not suitable for catalytic cracking operations because of their propensity for catalyst fouling or for catalyst deactivation by their content of asphaltenes or metals.

Coking of residuum feedstocks from heavy, sour (high sulfur) crude oil is carried out primarily as a means of disposing of low value residuum feedstocks by converting part of the resids to more valuable liquid and gas products. The resulting coke is usually treated as a low value by-product.

The use of heavy crude oils having higher metal and sulfur contents is increasing in many refineries, and delayed coking operations are of increasing importance to refiners. The increasing concern for minimizing air pollution is of further incentive for treating residuum feedstocks in a delayed coker, as the coker produces gases and liquids having sulfur in a form that can be relatively easily removed.

In the delayed coking process, fresh feedstock is introduced into the lower part of a fractionation column and the fractionator bottoms including heavy recycle material (termed flash zone gas oil or natural recycle) and fresh feedstock are heated to a coking temperature in a coker furnace. The hot feedstock then goes to coke drums maintained at coking conditions of temperature and pressure where the feedstock decomposes or cracks to form coke and volatile components. The volatile components are recovered as coke drum vapor and returned to the fractionation column. The heaviest components of the coke drum vapors are condensed by one of several methods, including direct or indirect heat exchange. Typically, heavy coker gas oil from the fractionation column is cooled by heat exchange with fresh feedstock and then returned to the fractionation column where it is sprayed into the fractionator flash zone to contact incoming vapors and condense the heavier components thereof.

The recycled material (termed flash zone gas oil or natural recycle) will be further cracked to lower boiling products which have greater utility even though the yield of coke ("coke make") is increased by this recycling. The metals and asphaltene content of the heavy coker gas oil product is reduced as the amount of natural recycle is increased.

Present trends in the petroleum refining industry are making it more and more desirable to utilize heavy coker gas oil as hydrocracker feedstock without substantially increasing the natural recycle rate. When heavy coker gas oil is being prepared for hydrocracker feedstock, the amount of natural recycle must be increased (which requires an increase in the amount of flash zone spray material) and downgrades the overall coker yields. Existing delayed coking technology includes increased capital costs due to the addition of a heavy heavy gas oil pump-around system that minimizes the increase in natural recycle to produce the required quality of heavy coker gas oil, or uses shed decks in the flash zone which are prone to coking and plugging unless relatively high natural recycle rates are employed.

Therefore, a need exists for an efficient method of producing heavy coker gas oil of sufficient quality to be used as feedstock for a hydrocracker.

SUMMARY OF THE INVENTION

In one embodiment of the present invention, a delayed coking process including the following the steps: (a) introducing coke drum vapors into a flash zone of a fractioning column of a delayed coking unit, wherein the delayed coking unit includes a coker furnace, at least two coke drums, a coke transfer line extending from the coker furnace to the coke drums, a fractionating column having multiple separation trays, a coke drum vapor line extending from the coke drums to the fractionating column, wherein the fractionating column having multiple separation trays is a cylindrical shaped vessel, wherein the fractionating column is defined by sidewalls, a bottom end, and an upper end, wherein the fractionating column includes a light coker gas oil draw, a heavy coker gas oil draw located below the light coker gas oil draw, a heavy heavy coker gas oil draw located below the heavy coker gas oil draw, a flash zone located below the heavy heavy gas coker oil draw, a coke drum vapor inlet located within the flash zone, and spray nozzles located within the flash zone above the coke drum vapor inlet; (b) removing a light coker gas oil stream from the fractionating column via the light coker gas oil draw; (c) removing a heavy coker gas oil stream from the fractionating column via the heavy coker gas oil draw; (d) introducing at least a portion of the heavy coker gas oil stream into the fractionating column, wherein the at least a portion of the heavy coker gas oil stream is introduced into the fractionating column below the heavy coker gas oil draw and above the heavy heavy coker gas oil draw; (e) withdrawing at least a portion of the heavy coker gas oil stream as an end product; (f) introducing a remaining portion of the heavy coker gas oil stream into at least one heat exchanger, wherein upon exiting the heat exchanger the remaining portion of heavy coker gas oil stream is divided into a first stream and a second stream; (g) introducing the first stream into the fractionating column, wherein the first stream is introduced into the fractionating column above the heavy coker gas oil draw; (h) introducing the second stream into the fractionating column, wherein the second stream is introduced into the fractionating column at the heavy heavy coker gas oil draw; (i) removing a heavy heavy coker gas oil stream from the fractionating column via the heavy heavy coker gas oil draw; and (j) introducing the heavy heavy coker gas oil stream into the flash zone of the fractionating column, wherein the heavy heavy coker gas oil stream is utilized for the spray nozzles.

In another embodiment of the present invention, a delayed coking process includes The following the steps: (a) introducing coke drum vapors into a flash zone of a fractioning column of a delayed coking unit; (b) removing a heavy coker gas oil stream from the fractionating column via a heavy coker gas oil draw of the fractionating column; (c) withdrawing at least a portion of the heavy coker gas oil stream as an end product; (d) introducing at least a portion of the heavy coker gas oil stream into the fractionating column; (e) introducing a remaining portion of the heavy coker gas oil stream into at least one heat exchanger, wherein upon exiting the heat exchanger the remaining portion of the heavy coker gas oil stream is divided into a first stream and a second stream; (f) introducing the first stream into the fractionating column; (g) introducing the second stream into the fractionating column; (h) removing a heavy heavy coker gas oil stream from the fractionating column via a heavy heavy coker gas oil draw; and (i) introducing the heavy heavy coker gas oil stream into the flash zone of the fractionating column.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Reference will now be made in detail to embodiments of the invention, once or more examples of which are illustrated in the accompanying drawings. Each example is provided by way of explanation of the invention, not as a limitation of the invention. It will be apparent to those skilled in the art that various modifications and variation can be made in the present invention without departing from the scope or spirit of the invention. For instances, features illustrated or described as part of one embodiment can be used on another embodiment to yield a still further embodiment. Thus, it is intended that the present invention cover such modifications and variations that come within the scope of the appended claims and their equivalents.

Figure 1:
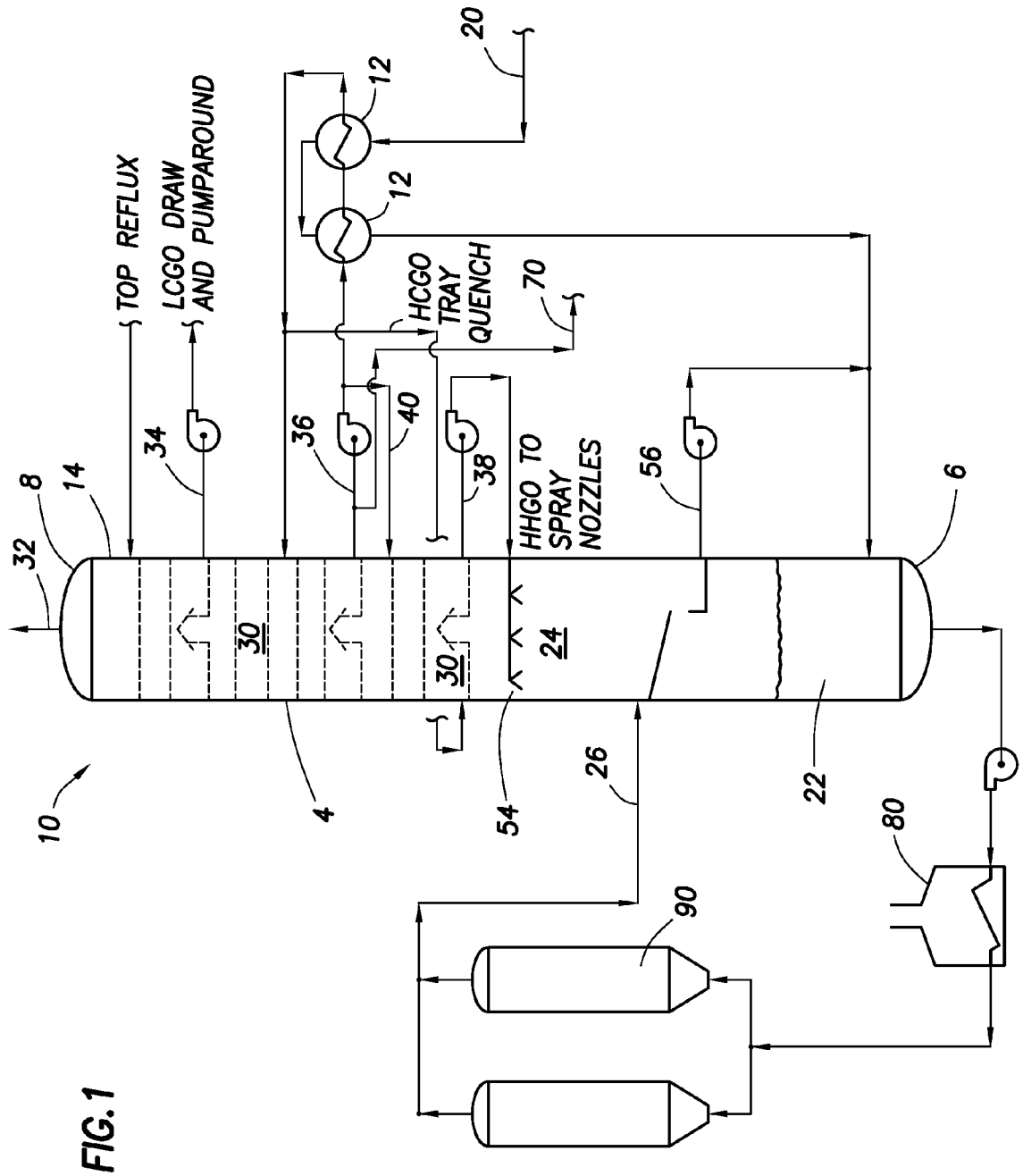
FIG. 1 is a schematic diagram of a delayed coking process utilizing a preferred embodiment of the present invention.

Referring to FIG. 1, a delayed coking unit incorporating features of the present invention is shown. The delayed coking unit includes coker furnace 80, at least two coke drums 90 which are alternately filled and emptied in a conventional manner, coke transfer line extending from the coker furnace to the coke drums for delivering feedstock from the coker furnace to the coke drums, a coke drum vapor line 26 extending from the top of the coke drums to the coker fractionation system 10 which functions to separate the coke drum vapors into various hydrocarbon streams.

As illustrated in FIG. 1, the coker fractionation system 10 includes a fractionation column or vessel 14 having multiple separation trays 30. The fractionation column 14 is cylindrical and is defined by sidewalls 4, an upper end 8 and a lower end 6. The multiple separation trays 30 are located within the sidewalls 4 and between the two ends 6 and 8. The fractionation column 14 further includes a vapor outlet 32 located at the upper end 8 of the fractionation column 14, a light coker gas oil (LCGO) draw 34 located near the upper end 8 of the fractionation column 14, a heavy coker gas oil (HCGO) draw 36 located below the LCGO draw 34, a heavy heavy gas oil (HHGO) draw 38 located below the HCGO draw 36, a flash zone 24 located immediately below the lowest separation tray 30, spray nozzles 54 located in the flash zone 24, and a coke vapor inlet located within the flash zone 24. As will be appreciated, the invention is not limited to any particular type of fractionation column or fractionation process and can be practiced with a packed fractionation column using any type of column packing materials as well as with various types of trayed columns having any number of trays.

Fresh feedstock is introduced to the coker fractionating system 10 via fresh feed line 20. The fresh feedstock stream is introduced to the heat exchanges 12 to provide heat exchange to preheat the fresh feedstock with at least a portion of a heavy coker gas oil stream exiting the fractionation column 14 via the heavy coker gas oil draw 36. Suitable hydrocarbon feedstock for delayed coking may be derived from petroleum, shale, coal, tar and/or other hydrocarbon sources. It is typically a heavy low-grade oil such as heavy virgin crude, reduced crude, topped crude, residuums from refining processes such as thermal or catalytic cracking processes or blends of such stocks. These feedstocks may be hydrotreated, if desired, before being fed to the coking process to remove sulfur, metals, and other contaminants. The preheated feedstock then passes to the bottom of fractionating column 14 below flash zone gas oil draw 56.

Coke drum vapors from the coke drums 90 flows through the coke vapor inlet 26 and are introduced to flash zone 24 below the spray nozzles 54. Upon entering flash zone 24, the heaviest components of the incoming coke drum vapors are condensed by contact with heavy heavy gas oil (HHGO) from spray nozzles 54. The condensed material falls into the bottom of the flash zone 24 where at least a portion of the flash zone gas oil (e.g., natural recycle) exits the fractionation column 14 via flash zone gas oil draw 56. Any heavy heavy coker gas oil from spray nozzles 54 which is not vaporized in the flash zone also combines with at least a portion of the flash zone gas oil to the bottom of the flash zone 24. As shown in FIG. 1, at least a portion of the flash zone gas oil exits the fractionation column 14 via flash zone gas oil draw 56, is combined with the preheated fresh feedstock and is introduced to the bottom reservoir 22 of the fractionation column 14. The mixture of at least a portion of the preheated fresh feed and at least a portion of the flash zone gas oil sent to the bottom reservoir 22 is subsequently withdrawn from fractionation column 14 and introduced to coker furnace 80.

In an alternate embodiment, a flash zone gas oil draw is not necessary.

Heavy heavy gas oil (HHGO) is withdrawn from HHGO draw 38 of fractionation column 14 from a final separation tray located directly above the flash zone 24. The HHGO is then pumped down to flash zone 24 to be utilized by the spray nozzles 54. As previously mentioned, the coke drum vapors from inlet 26 are contacted with HHGO from spray nozzles 54 to condense the heavier components from the incoming coker vapor stream. Most of the HHGO is vaporized by contact with incoming vapors, and the heaviest components of the coke drum vapors are condensed.

Heavy coker gas oil is withdrawn from fractionator 14 via heavy coker gas oil draw 36. A portion of the heavy coker gas oil is pumped down to lower separation trays via heavy coker gas oil pump-down line 40. A portion of the heavy coker gas oil is sent off as product and the remaining portion of heavy coker gas oil is pumped through heat exchangers 12 to preheat the fresh feed from fresh feed line 20. A portion of the heavy coker gas oil exiting the heat exchangers 12 is diverted and introduced onto the HHGO draw tray immediately above the flash zone 24 to be utilized as tray quench to prevent coke deposition in the HHGO draw tray. The remaining heavy coker gas oil exiting heat exchanger 12 is introduced to a number of separation trays located above the heavy coker gas oil draw 36.

Figure 1A:
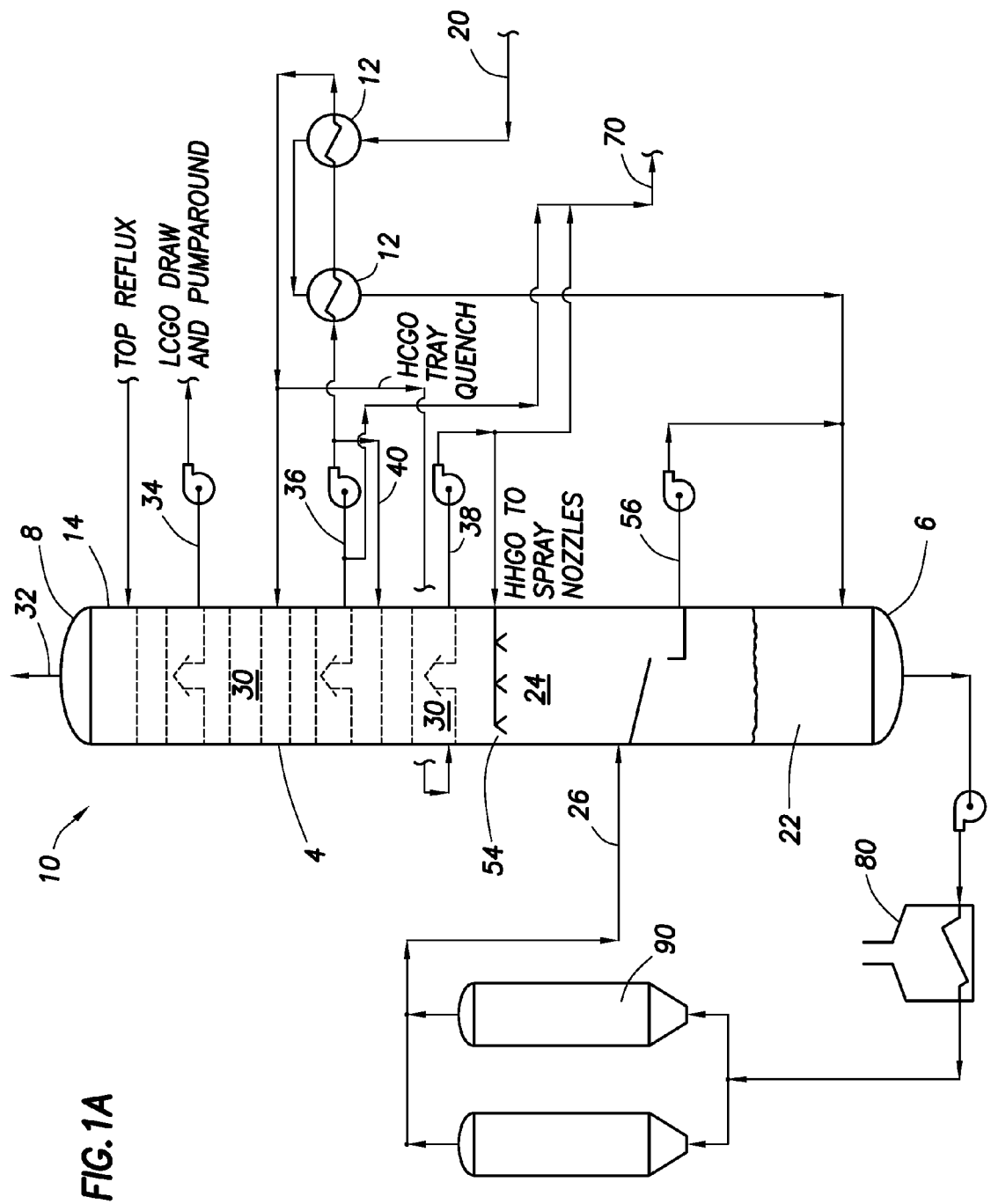
FIG. 1A is a schematic diagram of an alternate embodiment of the delayed coking process in accordance with the present invention.

FIG. 1A provides a further exemplary embodiment of the present invention. Upon exiting the HHGO draw 38 tray of the fractionation column 14, a portion of the HHGO is sent to HCGO product. Thus, allowing for further reduction of natural recycle at the expense of the HCGO quality while ensuring the reliable operation of the HHGO trays.

Figure 1B:
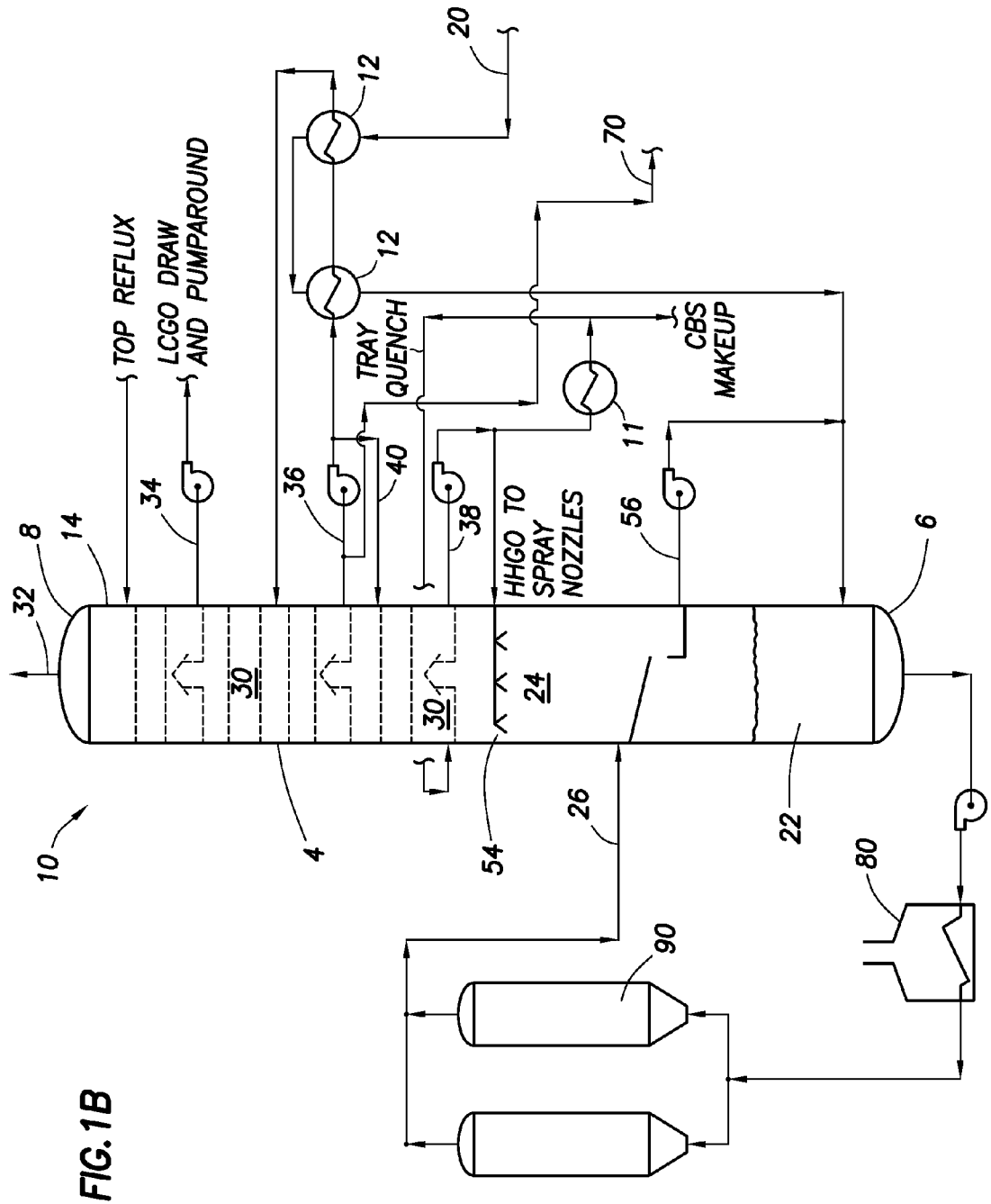
FIG. 1B is a schematic diagram of an alternate embodiment of the delayed coking process in accordance with the present invention.

FIG. 1B provides an additional exemplary embodiment of the present invention. Upon exiting the HHGO draw 38 tray of the fractionation column 14, a portion of the stream is introduced into a heat exchanger 11. Upon exiting the heat exchanger 11 a portion of the stream is used as HHGO draw 38 tray quench. The remaining portion of the stream from the heat exchanger 11 is utilized as makeup oil.

The present invention results in heavy coker gas oil of improved hydrocracker feedstock quality with minimal increase in natural recycle. It also provides improvements in the economics of a coking operation by employing a scheme requiring less equipment.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described in the present invention. It is the intent of the inventors that variations and equivalents of the invention are within the scope of the claims below and the description, abstract and drawings not to be used to limit the scope of the invention.

The invention claimed is:

1. A delayed coking process comprising the following steps:
   a. introducing coke drum vapors into a flash zone of a fractioning column of a delayed coking unit, wherein the delayed coking unit includes a coker furnace, at least two coke drums, a coke transfer line extending from the coker furnace to the coke drums, a fractionating column having multiple separation trays, a coke drum vapor line extending from the coke drums to the fractionating column, wherein the fractionating column having multiple separation trays is a cylindrical shaped vessel, wherein the fractionating column is defined by sidewalls, a bottom end, and an upper end, wherein the fractionating column includes a light coker gas oil draw, a heavy coker gas oil draw located below the light coker gas oil draw, a heavy heavy coker gas oil draw located below the heavy coker gas oil draw, a flash zone located below the heavy heavy coker gas oil draw, a coke drum vapor inlet located within the flash zone, and spray nozzles located within the flash zone above the coke drum vapor inlet;
   b. removing a light coker gas oil stream from the fractionating column via the light coker gas oil draw;
   c. removing a heavy coker gas oil stream from the fractionating column via the heavy coker gas oil draw;
   d. introducing at least a portion of the heavy coker gas oil stream into the fractionating column, wherein the at least a portion of the heavy coker gas oil stream is introduced into the fractionating column below the heavy coker gas oil draw and above the heavy heavy coker gas oil draw;
   e. withdrawing at least a portion of the heavy coker gas oil stream as an end product;
   f. introducing a remaining portion of the heavy coker gas oil stream into at least one heat exchanger, wherein upon exiting the heat exchanger the remaining portion of heavy coker gas oil stream is divided into a first stream and a second stream;
   g. introducing the first stream into the fractionating column, wherein the first stream is introduced into the fractionating column above the heavy coker gas oil draw;
   h. introducing the second stream into the fractionating column, wherein the second stream is introduced into the fractionating column at the heavy heavy coker gas oil draw;
   i. removing a heavy heavy coker gas oil stream from the fractionating column via the heavy heavy coker gas oil draw; and
   j. introducing the heavy heavy coker gas oil stream into the flash zone of the fractionating column, wherein the heavy heavy coker gas oil stream is utilized for the spray nozzles.

2. The delayed coking process according to claim 1, wherein several fractionating trays below the heavy coker gas oil draw improve the separation between the heavy coker gas oil draw and the oil condensed in the flash zone.

3. The delayed coking process according to claim 1, wherein the second stream is utilized to quench material removed at the heavy heavy coker gas oil draw.

4. The delayed coking process according to claim 1, wherein the spray nozzles in the fractionating column function to condense the incoming streams, 5. The delayed coking process according to claim 1, wherein at least a portion of the heavy coker gas oil stream of step (e) is sent as an end product to a stripper.

6. A delayed coking process comprising the following steps:
   a. introducing coke drum vapors into a flash zone of a fractioning column of a delayed coking unit;
   b. removing a heavy coker gas oil stream from the fractionating column via a heavy coker gas oil draw of the fractionating column;
   c. withdrawing at least a portion of the heavy coker gas oil stream as an end product;
   d. introducing at least a portion of the heavy coker gas oil stream into the fractionating column;
   e. introducing a remaining portion of the heavy coker gas oil stream into at least one heat exchanger, wherein upon exiting the heat exchanger the remaining portion of the heavy coker gas oil stream is divided into a first stream and a second stream;
   f. introducing the first stream into the fractionating column;
   g. introducing the second stream into the fractionating column;
   h. removing a heavy heavy coker gas oil stream from the fractionating column via a heavy heavy coker gas oil draw; and
   i. introducing the heavy heavy coker gas oil stream into the flash zone of the fractionating column.

7. The delayed coking process according to claim 6, wherein the delayed coking unit includes a coker furnace, at least two coke drums, a coke transfer line extending from the coker furnace to the coke drums, a fractionating column having multiple separation trays, and a coke drum vapor line extending from the coke drums to the fractionating column, wherein the fractionating column.

8. The delayed coking process according to claim 7, wherein the fractionating column having multiple separation trays is a cylindrical shaped vessel.

9. The delayed coking process according to claim 6, wherein the fractionating column is defined by sidewalls, a bottom end, and an upper end, wherein the fractionating column includes a light coker gas oil draw, a heavy coker gas oil draw located below the light coker gas oil draw, a heavy heavy coker gas oil draw located below the heavy coker gas oil draw, a flash zone located below the heavy heavy coker gas oil draw, a coke drum vapor inlet located within the flash zone, and spray nozzles located within the flash zone above the coke drum vapor inlet.

10. The delayed coking process according to claim 9, wherein the at least a portion of the heavy coker gas oil stream is introduced into the fractionating column below the heavy coker gas oil draw and above the heavy heavy coker gas oil draw.

11. The delayed coking process according to claim 10, wherein the first stream is introduced into the fractionating column above the heavy coker gas oil draw.

12. The delayed coking process according to claim 10, wherein the second stream is introduced into the fractionating column at the heavy heavy coker gas oil draw.

13. The delayed coking process according to claim 10, wherein the heavy heavy coker gas oil stream is utilized for the spray nozzles.

14. The delayed coking process according to claim 6, wherein at least a portion of the heavy coker gas oil stream of step (e) is sent as an end product to a stripper.

* * * * *